United States Patent [19]

Kawai

[11] 4,330,176
[45] May 18, 1982

[54] LENS ASSEMBLY FOR ENABLING CHANGE OF IMAGE POSITION IN A CAMERA

[75] Inventor: Tohoru Kawai, Kawasaki, Japan

[73] Assignee: Canon Kabushiki Kaisha, Tokyo, Japan

[21] Appl. No.: 196,439

[22] Filed: Oct. 14, 1980

[30] Foreign Application Priority Data

Oct. 18, 1979 [JP] Japan .......................... 54-144061[U]
Jan. 10, 1980 [JP] Japan .............................. 55-1302[U]

[51] Int. Cl.³ .............................................. G02B 7/04
[52] U.S. Cl. .................................. 350/252; 350/255; 354/195; 354/286
[58] Field of Search ................. 350/19, 252, 255, 257, 350/429, 454; 354/195, 286, 293

[56] References Cited

U.S. PATENT DOCUMENTS 3,045,550  7/1962  Kellner ........................... 350/255 X
4,187,020  2/1980  Ishii et al. ....................... 354/286 X

FOREIGN PATENT DOCUMENTS 2333760  1/1974  Fed. Rep. of Germany ........ 350/19

Primary Examiner—F. L. Evans
Attorney, Agent, or Firm—Toren, McGeady and Stanger

[57] ABSTRACT

A lens assembly for a camera which enables rotation of the camera relative to a front member of the lens assembly in order to alter the image position thereof is formed with the lens barrel divided into a forward lens barrel part and a rear lens barrel part, with the forward lens barrel part being adapted to be carried on a tripod, and with the rear lens barrel part being made capable of rotation together with a camera body attached thereto relative to the forward or front lens barrel part. The mechanism is formed with a counterbore in the rear end of the front lens barrel part which may be fitted over a head portion of the rear lens barrel part with a clamping device providing a click mechanism being arranged therebetween.

4 Claims, 4 Drawing Figures

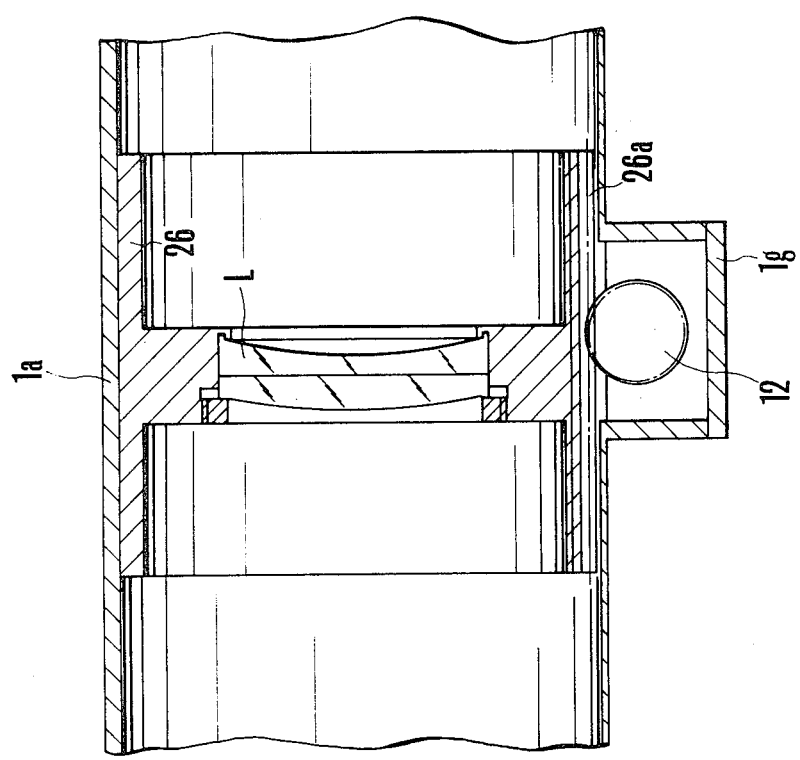

LENS ASSEMBLY FOR ENABLING CHANGE OF IMAGE POSITION IN A CAMERA

BACKGROUND OF THE INVENTION

The present invention relates generally to photographic equipment and more particularly to a mechanism for enabling the parts of a photographic camera assembly to be rotated in order to change the image position within the camera.

In the photographic arts, situations arise where during the exposure of film, the camera may be rotated from a horizontal to a vertical position, or vice versa, during shooting of the same scene. With objective lenses which may be heavy or bulky, a tripod is used to support the camera by supporting the bulky or heavy lens barrel of the lens assembly and it is common practice in the prior art to revolve the camera body together with the lens barrel.

Management of an assembly of this type requires laborious manual manipulation, particularly when the angular position of the image format in the camera is to be changed rapidly. Furthermore, problems arise because of the weight of the lens assembly and it often occurs that the tripod is unintentionally displaced from its fixed position, thereby giving rise to deviation of the distance between the object and the film plane or image plane in the camera. Additionally, the framing point may be unintentionally altered and there thus necessarily occurs the requirement for readjusting focusing of the lens and for incurring the possibility of accidental shifting of the picture area.

In photographic devices involving interchangeable lens assemblies, there is provided a mechanism for revolving the image format on the camera through an angle of, for example, 90 degrees while maintaining the operative connection between the exposure control mechanism in the camera and the diaphragm device in the lens barrel. However, this mechanism tends to be large in size and weight and is relatively bulky to handle. Thus, in order to properly support the lens assembly on the tripod, the camera must be revolved along with the lens barrel relative to the stationary tripod about the optical axis of the lens assembly. As a result, the necessity arises for providing a bearing mechanism or gear device between the tripod and the lens barrel. This produces disadvantages in that a necessity arises for increasing the diameter of the lens barrel and for increasing the complexity of the mechanism.

In view of the foregoing, the present invention is directed toward providing a mechanism for enabling an image on a camera to be revolved whereby the camera body may be rotated through a desired angle, for example 90 degrees or 180 degrees, without causing a shift in the sharpness of the image plane or the picture area and which may operate effectively despite heavy weight of the lens barrel to enable a desired orientation of the angular position of the image frame by a quick and easy manipulation of the assembly.

A further aim of the invention is to provide a revolving mechanism which makes it possible to revolve the image frame while simultaneously maintaining operative connection between an exposure control mechanism in the camera body and the diaphragm device in the lens assembly.

Furthermore, the invention is directed toward providing a revolving mechanism capable, upon revolution of the image frame about the optical axis through a specified angle, of latching the camera body in a predetermined position relative to the lens assembly so that the camera may be held in that position.

An advantageous feature of the mechanism of the invention is that it enables the aforementioned operational features to be achieved with a lens assembly which may be designed similar to conventional structures, thereby avoiding the necessity for increase in the diameter of the lens barrel and in the complexity of the structure and of the weight thereof.

SUMMARY OF THE INVENTION

Briefly, the present invention may be described as a lens assembly for a camera adapted to enable change in the image position on the camera by rotation of the camera relative to the components of the lens assembly comprising lens barrel means divided into a first lens barrel member and a second lens barrel member with the first lens barrel member having holding means thereon for enabling it to be affixed to a tripod and with the second lens barrel means having mounted therein the diaphragm means of the lens assembly and including means for mounting the lens barrel means upon a camera. The second lens barrel member is arranged to be rotatable about the optical axis of the lens assembly and to be rotatable relative to the first lens barrel member whereby the camera and the second lens barrel member may be rotated to change the image position on the camera while the first lens barrel member is held fixed by the tripod.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIGS. 3a and 3b are, respectively, an axial sectional view and a lateral sectional view of parts of the lens assembly of the invention showing a focusing mechanism arranged in the forward part of the lens barrel of FIG. 1, with FIG. 3a being taken along the line $B_1$—$B_2$ of FIG. 1.

DETAILED DESCRIPTION OF THE PREFERRED EMBODIMENT

Figure 1:
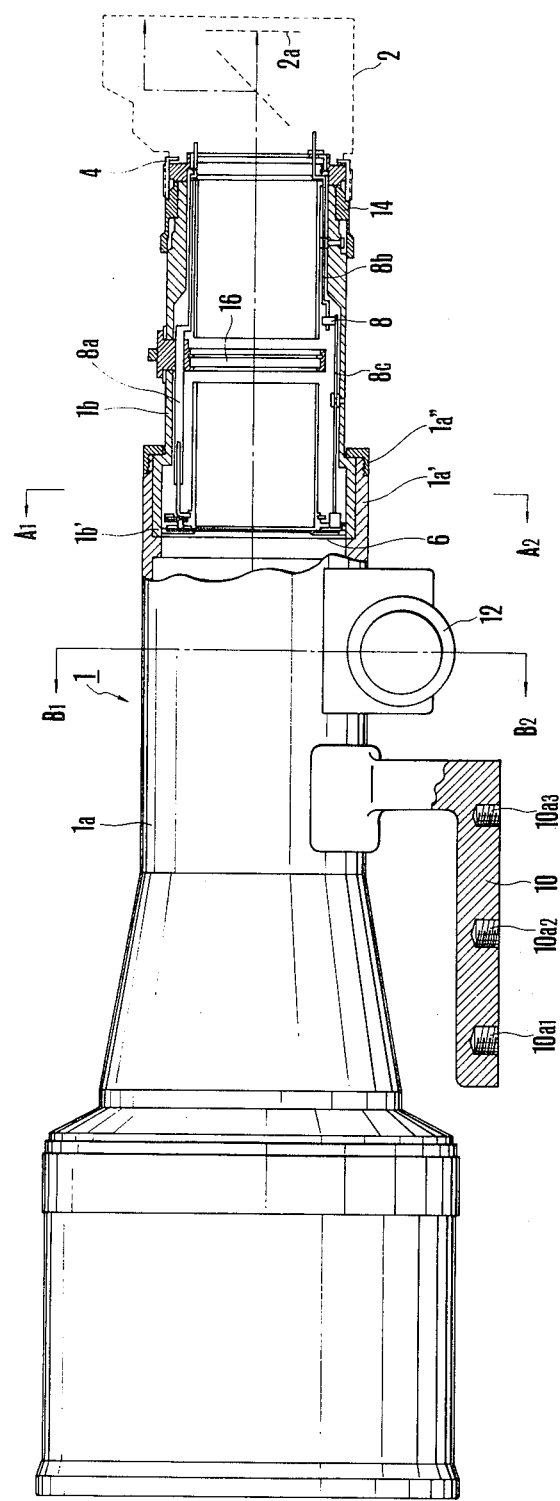
FIG. 1 is a partially sectional side view of a lens assembly embodying the present invention.

Referring now to the drawings, wherein similar reference numerals are used to identify like parts throughout the various figures thereof, the present invention is shown as comprising a lens barrel assembly divided into front and rear parts so that these two parts may be rotatable relative to each other about a common optical axis whereby as the camera is supported at the front part of the lens barrel by a tripod and the camera body is affixed on the rear part of the lens barrel assembly, the aforementioned drawbacks of conventional camera holding mechanisms may be eliminated.

Figure 2:
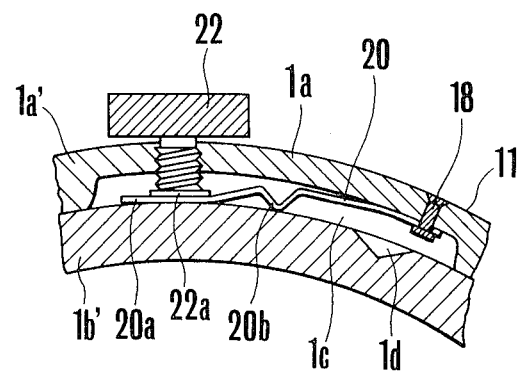
FIG. 2 is a fragmentary sectional view taken along the line $A_1$—$A_2$ of FIG. 1 showing an example of latching means for the revolving mechanism of the lens assembly of the invention.

With reference to FIGS. 1 and 2, an embodiment of the present invention is shown as comprising a lens barrel 1, a camera body 2 carried by a mount portion 4 of the lens barrel 1, with the lens barrel 1 consisting of a front part 1a including a focusing lens member (not shown) and a rear part 1b including a diaphragm unit 6 and a diaphragm control mechanism 8 for controlling operation of the diaphragm unit 6.

The front barrel member 1a is provided with a counterbored portion 1a' at the rear end thereof. The rear barrel member 1b is provided with a head portion 1b' at the front end thereof which is rotatably fitted in the counterbore 1a', and which is restrained from axial movement by a retainer ring 1a'' which abuts against the rear shoulder of the head portion 1b' and which is threaded and locked into the front barrel member 1a.

A tripod member 10 is formed with tripod sockets $10a_1$, $10a_2$, $10a_3$, each equipped with a bushing. A focusing control member 12, which may be, for example, a knurled knob, is provided for enabling axial movement of a focusing member (not shown) included in the front barrel member 1a.

Provided in the interior of the rear barrel member are the diaphragm units 6 and signal transmitting members 8a, 8b, and 8c of a diaphragm control mechanism 8. The signal transmitting members are arranged to operatively connect the diaphragm means of the lens assembly, including a diaphragm setting ring 14, with members (not shown) which are located within the camera body 2 and which operate to effect control of the diaphragm elements in the lens assembly. A filter member 16 may either be built into the lens assembly or it may be detachably mounted in the rear barrel member thereof.

In a situation where the camera with the lens assembly having the construction previously described is utilized on a tripod, when an operator desires to alter the angular position of the film frame 2a in the camera body 2 in order to change the image position relative thereto, it is necessary only to rotate the camera body 2 about the optical axis of the assembly by an angle of 90 degrees, whereby the head portion 1b' of the rear barrel member 1b will revolve in engagement with the counterbore 1a' of the front barrel member which is maintained stationary. Thus, the head portion 1b' of the rear barrel member 1b and the counterbore portion 1a' of the front barrel member 1a will be seen to constitute a revolving mechanism which permits rotation of the rear barrel member 1b together with the camera body 2 relative to the front barrel member 1a in order to enable the image position on the film frame to be either horizontally or vertically oriented when the front barrel member 1a is fixedly mounted on a stationary support such as a tripod.

It will be understood that such a revolving operation may be performed quickly and with ease without causing a previously established in-focus condition to be adversely affected, as would otherwise occur in connection with prior art devices.

FIG. 2 shows a clamping mechanism arranged within the revolving mechanism described in connection with FIG. 1, with the clamping mechanism being located in engagement between the engagement portion 1a' of the front barrel member 1a which is fitted on one end of the head portion 1b' of the rear barrel member.

The clamping mechanism as shown in FIG. 2 has ascribed thereto reference characters similar to those employed to denote like parts shown in FIG. 1. In FIG. 2, a portion of a sectional view taken along the line $A_1$—$A_2$ of FIG. 1 is shown wherein the engagement portion 1a' of the front barrel 1a is provided with a gap or air space 1c and with a leaf spring 20 fixedly mounted in the gap 1c by a rivet or screw fastener. A free end 20a of the leaf spring 20 is arranged so that it may be affixed under pressure by a pressing portion 22a of a pressing member 22 from the outside of the lens assembly. Near the center of the leaf spring 20 there is provided a convex portion 20b having a convex shape which may be either acute or of a semicircular configuration as shown in FIG. 2. The convex portion 20b is in pressure contact on the exterior of the stationary barrel 1 and when it engages within a click groove 1d, it will exert a clicking action.

The click groove 1d may be provided on the fixed barrel member at a predetermined engagement position of the rotatable member. With the convex portion 20b of the spring dropped into the click groove 1d, the pressing member 22 is screwed down in order to press the free end 20a of the spring member against the rear barrel member 1b' whereby the front barrel 1a is fixed relative thereto. Even in a case where the front barrel 1a is intended to be affixed in an intermediate position which does not place the portion 20b in alignment with the click groove 1d on the fixed barrel, for example in a position such as that illustrated in FIG. 2, this mode of operation may be accomplished by pushing the pressing portion 22a of the pressing member 22 onto the free end 20a. Since, in this practical example, the convex portion 20b of the spring member is not directly pressed by the pressing member 22, an advantage is produced in that even when the front barrel member 1a is fixed in an arbitrary position, as illustrated in FIG. 2, where there is no utilization of the click groove 1d, there is provided nevertheless the possibility for avoiding a pressure mark on the rotational surface of the rear barrel member 1b and of thereby producing an undesirable impression and accidental acutation or faulty operation when the rotary member is turned.

In the operation of the mechanism of the present invention, when the photographic assembly is to be prepared for effecting exposure of film, the assembly may be attached to a tripod (not shown) by connection of the tripod with the tripod sockets $10a_1$–$10a_3$ and, with the assembly thus supported, when it is desired to alter the angular position of the film plane 2a of the camera 2, the rear barrel member 1b is rotated together with the camera body relative to the front part 1a affixed to the tripod.

In this case, a clamping mechanism as shown in FIG. 2 is arranged between the concave engagement portion 1a', 1a'' of the previously described front barrel and the convex engagement portion of the previously described rear barrel. In this case, the arrangement of the front barrel and the rear barrel is made to be reversed so that the front barrel fixedly carried on the tripod serves as a stationary barrel, and the rear barrel rotatable with reference to the front barrel serves as a rotary member, for the pressing member is mounted in the engagement portion 1a' of the front barrel. By utilization of the previously described clamping mechanism of FIG. 2 between the concave engagement portion 1a' of the 1d, it is possible to provide a lens barrel assembly which has excellent operational characteristics.

Since the lens barrel assembly shown in FIG. 1 has a focusing mechanism and an operating member therefor on the side of the front barrel which is fixed to the tripod, and since the assembly also includes a diaphragm mechanism, an operating mechanism therefor, and a camera body which is operably connected therewith on the side of the rear barrel member, rotation of the rear barrel member about the optical axis will make it possible to alter the angular position of the film frame 2a with ease and to effect clamping in an arbitrary angular position.

In tele-zoom lenses, rear focus type lenses and similar lenses, which tend to be of rather size and weight and to have a bulky configuration, the clamping mechanism arranged between the aforementioned convex portion 1d and concave portion 1a' often causes the production of deformations or scratches, since a large load or pressure is applied thereupon. However, the use of the clamping mechanism according to the present invention, such as that shown in FIG. 2, can eliminate these drawbacks in conventional revolving mechanisms.

Figure 3A:
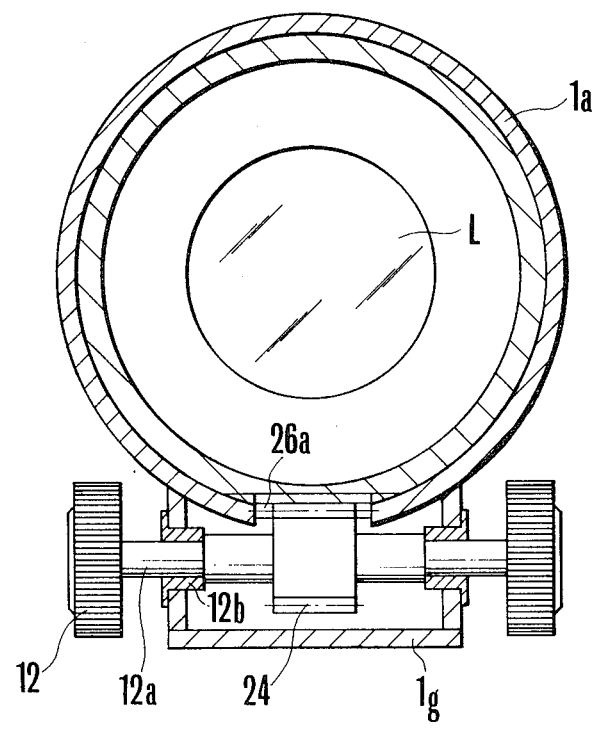

FIGS. 3(a) and 3(b) show a focusing mechanism utilized with the embodiment of the present invention. The lens barrel assembly of the invention is arranged to be divided into a front part and a rear part in order to arrange these parts in rotative relationship relative to each other. Positioned in the front part of the lens barrel assembly is the focusing optical system and in the rear part of the lens barrel assembly there is provided the diaphragm unit with the control mechanism therefor. Since the focusing mechanism may utilize a helicoid mechanism, and since in the case of a lens having large size and weight and a bulky configuration which may require the use of a tripod, a rack-and-pinion mechanism as shown in FIGS. 3(a) and 3(b) is considered particularly suitable for use in connection therewith. As shown in the drawings, this mechanism is provided with a gear box 1g affixed to the front barrel member 1a and having a focusing shaft 12a on a bearing 12b. At the center of the shaft 12a there is affixed a small gear 24 which meshes with a toothed portion 26a formed in a lens holding frame 26 which contains the focusing optical element L. Upon rotation of the focusing dial 12, the lens holding frame 26, movably fitted in the inner diameter of the front barrel member, is caused to move forward in an axial direction in order to effect focusing operation.

It will be apparent that the device of the present invention enables achievement of a significant improvement in the manageability of a camera assembly when exposures are to be made while changing the attitude of the image frame between an ordinary or horizontal and a position resulting from a rotation through 90 degrees about the optical axis so that the image may be vertically oriented on the film plane. The focusing mechanism may always be operated in a constant position despite the fact that the camera body is revolved and revolving of the camera need not affect the operative connection of the exposure control apparatus. Furthermore, the capabilities discussed above will not require an increase in the complexity of the structure of the overall assembly and there will be no adverse effects upon the functional features of the device.

While a specific embodiment of the invention has been shown and described in detail to illustrate the application of the inventive principles, it will be understood that the invention may be embodies otherwise without departing from such principles.

What is claimed is:

1. A lens assembly for a camera adapted to enable change in the image position by rotation of the camera relative to components of the lens assembly comprising:
    lens barrel means divided into a first lens barrel member and a second lens barrel member;
    (a) said first lens barrel member having holding means for affixing said lens barrel means to a tripod;
    (b) said second lens barrel means having diaphragm means operatively mounted therein and including means for mounting said lens barrel means upon a camera;
    (c) said second lens barrel member being arranged to be rotatable about the optical axis of said lens assembly relative to said first lens barrel member.

2. A lens assembly including a lens barrel for a camera adapted to enable change in the image position by rotation of the camera relative to components of the lens assembly comprising:
    (a) first lens barrel means including lens holder means having optical lens means mounted therein, focusing means for controlling axial movement of said lens holder means, and means for affixing said lens barrel to a stationary support;
    (b) second lens barrel means including mounting means for attachment to a camera, diaphragm means and linkage means in operative engagement with exposure control means in said camera; and
    (c) rotational means for enabling rotation of said second lens barrel means about the optical axis of said lens assembly as said first lens barrel means is movably fitted on said second lens barrel means.

3. An assembly according to claim 2 wherein said first and second lens barrel members include engagement portions which are constructed in the form of concave and convex members in the outer periphery of the lens barrel assembly to rotate about the optical axis.

4. An assembly according to claim 2 further comprising clamping means arranged between said first and said second lens barrel members, said clamping means being operative to affix said second lens barrel member to said first lens barrel member in arbitrary position when said second lens barrel member is rotated about the optical axis.

* * * * *